United States Patent Office 3,457,246
Patented July 22, 1969

3,457,246
COPOLYMERS OF 4-METHYL-1-PENTENE WITH LOWER 1-OLEFINS
James W. Cleary, Bartlesville, Okla., assignor to Phillips Petroleum Company, a corporation of Delaware
No Drawing. Continuation of application Ser. No. 251,036, Jan. 14, 1963. This application Mar. 3, 1967, Ser. No. 620,560
Int. Cl. C08f 15/04, 1/42
U.S. Cl. 260—88.2                      6 Claims

ABSTRACT OF THE DISCLOSURE

Solid copolymers of 4-methyl-1-pentene and a lower olefin selected from ethylene and propylene are produced by incrementally adding a plurality of increments of the lower olefin to the reaction phase during polymerization whereby the total amount of lower olefin so added is within the range of from about 0.25 to about 10 parts per 100 parts of said 4-methyl-1-pentene.

---

This application is a continuation of my copending application Ser. No. 251,036, filed Jan. 14, 1963, now abandoned.

This invention relates to copolymers of 4-methyl-1-pentene with lower 1-olefins.

Poly-4-methyl-1-pentene has been described before but the polymer was found to lack characteristics which are desirable for many applications, particularly the applications requiring that the polymer be soluble in hydrocarbon solvents. In addition, the polymer has a melting point too high generally for melt extrusion. However, the poly-4-methyl-1-pentene has high resistance against attack by chemical reagents and microorganisms which makes the polymer very desirable and potentially useful. It has also been discovered that copolymers of 4-methyl-1-pentene and higher 1-olefins produce a soluble, isotatic hydrocarbon copolymer. However, copolymers of 4-methyl-1-pentene with a lower 1-olefin have been found to produce a relatively insoluble product.

It is an object of the invention to provide a copolymer of 4-methyl-1-pentene and a lower 1-olefin.

It is another object of the invention to provide a copolymer of 4-methyl-1-pentene and a lower 1-olefin which is soluble in hydrocarbon solvent.

It is another object of the invention to provide a method for the production of a soluble copolymer of 4-methyl-1-pentene and a lower 1-olefin.

It is another object of the invention to provide a copolymer of 4-methyl-1-pentene and a lower 1-olefin having improved elongation characteristics.

These and other objects of the invention will be readily apparent to those skilled in the art from the accompanying disclosure and claims.

These and other objects of the invention are broadly accomplished by preparing the copolymer of 4-methyl-1-pentene and a lower 1-olefin by the method comprising polymerizing said 4-methyl-1-pentene under polymerization conditions while incrementally introducing the lower 1-olefin at a rate sufficient to produce a copolymer having an n-heptane soluble content of greater than 50 percent when determined as hereinafter described. The expressions "polymer" and "copolymer" are used interchangeably herein when referring to the polymer or copolymer of 4-methyl-1-pentene and a lower 1-olefin.

It has now been discovered that when the comonomer is incrementally introduced into the polymerization reactor in the presence of 4-methyl-1-pentene the copolymer thus produced surprisingly has an increased normal heptane solubility as compared to a copolymer produced by the simultaneous addition of the comonomer and 4-methyl-1-pentene to the reactor or as compared to a copolymer produced by the introduction of the 4-methyl-1-pentene in one stage into the reactor containing the comonomer.

The invention is broadly applicable to the polymerization of 4-methyl-1-pentene and lower 1-olefins. Particularly preferred mono-1-olefins are ethylene, propylene, 1-butene, and 1-pentene. Even more preferred are ethylene and propylene.

These polymers are prepared in the presence of a catalyst active for the copolymerization of the 4-methyl-1-pentene and the comonomer and the invention is not limited to a particular catalyst system. One suitable catalyst is prepared by admixing at least two essential components, one of said components being (1) a metal compound selected from the group consisting of Groups IV, V, VI and VIII metal compounds and another of said components being (2) selected from the group consisting of organometal compounds, metal hydrides and metals of Groups I, II, and III. A suitable catalyst system comprises a dialkylaluminum halide and a titanium halide, e.g., a dialkyl aluminum chloride and titanium trichloride. One presently preferred catalyst system comprises a diethylaluminum chloride and the reaction product of aluminum and titanium tetrachloride. Said reaction product can be represented approximately by the empirical formula $AlTi_3Cl_{12}$.

In one embodiment presently preferred, the polymerization is conducted in the presence of a small concentration of elemental hydrogen, preferably in the range of 0.25 to 2.5 mol percent of hydrogen based on 4-methyl-1-pentene.

The ratio of the catalyst components employed is variable rather widely depending upon the particular monomers employed and the operating conditions. The mole ratio of the Group I, II or III metal or metal compound to the Group IV, V, VI or VIII metal compound is usually in the range of 1:1 and 10:1 with the preferred range of 2:1 and 5:1. The concentration of the catalyst in the polymerization zone is usually in the range of 0.01 to 5 weight percent based on the total monomers charged to the zone although a lesser or greater amount can be employed.

In a preferred method for the preparation of the soluble 4-methyl-1-pentene copolymer, the catalyst, hydrogen and the 4-methyl-1-pentene monomer are charged to the reactor and the polymerization is initiated, for example, at a temperature in the range of between —75 and 175° F. The comonomer, for example propylene, is then introduced in increments beginning preferably 5 to 30 minutes after initiation and preferably continuing at 5 to 30 minute intervals for the entire polymerization period, usually from 2 to 5 hours. The size of the increments will vary depending upon the total charge of comonomer, the polymerization conditions, the catalyst and the product desired but generally the total charge of the comonomer, such as propylene, will be divided into increments of not less than 2 nor more than 60, preferably of approximately equal fractions.

The amount of the lower 1-olefin will vary over a wide range depending upon the desired polymer product but preferably the lower 1-olefin employed in the polymerization step is in the range of from about 0.25 to about 10.0, preferably from about 0.3 to 5.0, weight parts per 100 parts of 4-methyl-1-pentene.

It has been found that a major portion of the copolymers of 4-methyl-1-pentene and the lower 1-olefin produced by the method of this invention are soluble in organic solvents such as diethyl ether, chloroform, carbon tetrachloride, cyclohexane, benzene, toluene, xylene, chlorobenzene, tetrachloroethane, tetrahydrofuran, as well as a number of other similar solvents. A particularly preferred solvent is normal heptane. The term "soluble" or "n-heptane-soluble content" means that the polymer contains a major portion (50 percent or more) of a material which is soluble in normal heptane as further described in footnote (1) in Table I of Example I. Preferably, the normal heptane-soluble content of the copolymers of this invention is greater than 70 weight percent. Generally, the heptane-soluble content is in the range of 50 to 95, more preferably 70 to 90, weight percent.

end of the 150-minute reaction period, the unreacted monomer was vented and the reaction quenched with methanol. The polymer was removed from the reactor, chopped in a Waring Blendor in the presence of methanol, collected on a filter and dried in a vacuum oven at approximately 80° C. Run No. 1 was a control run in which there was no addition of propylene and Run No. 2 was a control run in which the reactor contained an original atmosphere of propylene of about 1.9 grams. Physical properties were determined. Data on these runs and physical properties are presented in Table I.

TABLE I

[4-methyl-1-pentene and propylene copolymers]

| Run No. | Propylene | | | | Conversion, percent | Solubles [1] | | Elongation,[2] percent | Density, gm./cc. | Shore D hardness [3] |
|---|---|---|---|---|---|---|---|---|---|---|
| | Increment, gms. | Interval of times, minutes | No. of increments | Total, gms. | | n-Heptane | Diethyl ether | | | |
| 1 | 0 | | | 0 | 46 | 16.4 | 11.7 | 3 | 0.8381 | 79 |
| 2 | 0 | | | [4] 0 | 48 | 44.0 | 24.5 | 1 | 0.8311 | 77 |
| 3 | 0.047 | 5 | 30 | 1.4 | 36 | 80.1 | 72.0 | 104 | 0.8464 | 60 |
| 4 | 0.094 | 10 | 15 | 1.4 | 39 | 94.9 | 71.2 | 138 | 0.8400 | 55 |
| 5 | 0.047 | 15 | 10 | 0.46 | 28 | 88.1 | 69.4 | | | |
| 6 | 0.14 | 15 | 10 | 1.41 | 38 | 91.5 | 69.0 | 124 | 0.8393 | 56 |

[1] The heptane or ether-soluble content was determined by extraction of the polymer with boiling pure-grade solvent or ether in an ASTM rubber extraction apparatus (see ASTM D-494-46, Fig. 1). This is a modified Soxhlet apparatus in which the extraction cup and thimble are immersed in the vapors from the boiling solvent to maintain the temperature of the condensed extracting liquid at or near the boiling point. Extraction time was 20 hours. The extracted polymer was dried at 110° C. for 2 hours prior to weighing the solvent-insoluble residue. Heptane or ether soluble=100 (heptane or ether insoluble).
[2] Determined by ASTM D-638-61T.
[3] Determined by ASTM D-1706-61.
[4] 1.9 gms. propylene present in atmosphere.

In addition, it has been found that the copolymer thus produced is less brittle than that produced by heretofore proposed methods. Preferably, the copolymer of this invention has an elongation of at least 40 percent, and even more preferably at least 100 percent. Generally, the elongation is in the range of 40 to 200 percent, preferably 40 to 160 percent.

In general, it has been found that the content of the n-heptane insoluble polymer decreases as the amount of lower 1-olefin per increment was increased at the same time interval. Also, these values increased with an increase in the time interval between addition of the same amount of lower 1-olefin in each increment. Tensile strength and elongations were more variable but tend to support these trends.

The products of the invention are useful for the fabrication of molded articles, films, fibers, textiles, and the like.

The invention is best illustrated by the following examples.

These data indicates that the incremental addition of propylene to a reactor containing 4-methyl-1-pentene under polymerization conditions produces a copolymer having a normal heptane-soluble content in excess of about 80 percent and considerably greater than in a similarly produced 4-methyl-1-pentene polymer (Run 1) or a copolymer of 4-methyl-1-pentene and propylene where the propylene was charged prior to initiation of the polymerization (Run 2). In addition, the incremental addition method produces a polymer having an elongation of greater than 100 percent, compared with 1-3 percent for either the 4-methyl-1-pentene polymer or a copolymer of 4-methyl-1-penten and propylene where the propylene was charged prior to initiation of the polymerization.

EXAMPLE II

A series of runs was made in the same manner as described in Example I except that the comonomer employed was ethylene. The results are tabulated in Table II.

TABLE II

[4-methyl-1-pentene and ethylene copolymers]

| Run No. | Ethylene | | | | Conversion, percent | Percent Solubles [1] | | Elongation,[2] percent | Density, gm./cc. | Shore D hardness [3] |
|---|---|---|---|---|---|---|---|---|---|---|
| | Increment, gms. | Interval of time, minutes | No. of increments | Total, gms. | | n-Heptane | Diethyl ether | | | |
| 1 | 0 | | | 0 | 51 | 10.6 | 8.1 | 1 | 0.8337 | 75 |
| 2 | 0.062 | 5 | 30 | 1.87 | 27 | 87.0 | 69.1 | 40 | 0.8491 | 38 |
| 3 | 0.125 | 5 | 30 | 3.75 | 24 | 74.1 | 57.9 | 150 | 0.8635 | 28 |
| 4 | 0.25 | 5 | 30 | 7.5 | 30 | 73.8 | 55.0 | 95 | 0.8746 | 25 |
| 5 | 0.062 | 10 | 15 | 0.94 | 18 | 80.7 | 62.7 | 60 | 0.8626 | 32 |

[1] Footnote 1, Table I.  [2] Determined by ASTM D-638-61T.  [3] Determined by ASTM D-1706-61.

EXAMPLE I

A series of runs was made in which 4-methyl-1-pentene and propylene were polymerized in the presence of a catalyst system comprising diethylaluminum chloride and the reaction product of aluminum and titanium tetrachloride containing 24.5 weight percent titanium and 71.2 percent chloride. These runs were made in a 1-liter stainless-steel stirred reactor using 150 grams of 4-methyl-1-pentene, 1 millimole of aluminum titanium tetrachloride reaction product, 3 millimoles of diethylaluminum chloride, and 44 millimoles of hydrogen. The temperature was maintained at 65° C. During the polymerization, small amounts of propylene were incrementally injected at regular intervals as shown in the following Table I. At the These data indicate that copolymers of 4-methyl-1-pentene and ethylene are producible which have normal heptane-soluble contents greater than about 74 percent by the incremental addition of ethylene whereas the heptane-soluble content of the 4-methyl-1-pentene polymer was only 10.6 percent. Further, the copolymer thus produced is considerably less brittle as evidenced by an elongation of 40 percent or greater compared with 1 percent for the 4-methyl-1-pentene polymer.

I claim:

1. A solid copolymer of 4-methyl-1-pentene and a lower olefin selected from ethylene and propylene formed by subjecting 4-methyl-1-pentene to polymerizing conditions, and adding thereto, during the course of said polymerization, a plurality of about equal increments of said lower olefin, the total amount of said lower olefins so added being from about 0.25 to about 10 part per 100 parts by weight of said 4-methyl-1-pentene, all of said 4-methyl-1-pentene having been added prior to said lower olefin addition.

2. The copolymer of claim 1 wherein said lower olefin is added in from 2 to 60 incremental portions, said increments are added at intervals of 5 to 30 minutes, the amount of said lower olefin so added is from about 0.3 to about 5 parts per 100 parts of said 4-methyl-1-pentene, said polymerization occurs at a temperature from about $-75°$ to about 175° F. so as to form a copolymer having an n-heptane soluble content of greater than about 50 percent.

3. The copolymer of claim 2 wherein said lower olefin is ethylene and said copolymer has an elongation of at least 40 percent, density at least .8491, and Shore D hardness between about 25 and about 38.

4. The copolymer of claim 2 wherein said lower olefin is propylene and said copolymer has an elongation of at least about 100 percent, density at least .8393, and Shore D hardness between about 55 and about 60.

5. The copolymer of claim 1 wherein said polymerization is conducted in the presence of 0.25 to 2.5 mol percent of hydrogen based on 4-methyl-1-pentene.

6. The copolymer of claim 1 wherein from 0.3 to 5 parts of said lower olefin is added to 100 parts of 4-methyl-1-pentene in 10 to 30 equal incremental portions, with 5 to 15 minute intervals between portions, the temperature of said polymerization is maintained at about 65° C, and said polymerization occurs in the presence of elemental hydrogen and of a catalyst comprising diethylaluminum chloride and the reaction product of aluminum and titanium tetrachloride.

References Cited

UNITED STATES PATENTS 3,029,215   4/1962   Campbell _____ 260—88.2

FOREIGN PATENTS 856,733   12/1960   Great Britain.

OTHER REFERENCES

Margenson et al., Introduction to Polymer Chemistry (1967) pp. 9–11.

JOSEPH L. SCHOFER, Primary Examiner

L. EDELMAN, Assistant Examiner

U.S. Cl. X.R.

260—94.9